United States Patent [19]

Frost

[11] 4,112,257

[45] Sep. 5, 1978

[54] COMPREHENSIVE AUTOMATIC MOBILE RADIO TELEPHONE SYSTEM

[76] Inventor: Edward G. Frost, 12000 Old Georgetown Rd., Rockville, Md. 20852

[21] Appl. No.: 780,915

[22] Filed: Mar. 24, 1977

[51] Int. Cl.² .............................................. H04M 7/04
[52] U.S. Cl. .................................. 179/2 EB; 325/55; 325/64
[58] Field of Search ............... 179/2 EB, 2 EA, 41 A; 325/40, 53, 54, 55, 58, 64, 51, 56

[56] References Cited

U.S. PATENT DOCUMENTS

| | | | |
|---|---|---|---|
| 3,105,118 | 9/1963 | Berglund | 325/55 |
| 3,609,246 | 9/1971 | Muller et al. | 179/2 EB |
| 3,663,762 | 5/1972 | Joel, Jr. | 179/2 EB |
| 3,806,804 | 4/1974 | Mills et al. | 325/55 |
| 3,819,872 | 6/1974 | Hamrick | 179/2 EB |
| 3,894,194 | 7/1975 | Frost | 179/2 EB |

*Primary Examiner*—Kathleen H. Claffy
*Assistant Examiner*—Gerald L. Brigance
*Attorney, Agent, or Firm*—Rose & Edell

[57] ABSTRACT

In a multi-channel mobile radio telephone system with multiple base stations covering different geographical areas, mobiles may move freely from area to area and automatically originate and receive calls to and from a land-switched telephone network by direct dialing to and from anywhere in the system by means of a Roving Mobile Call System (RMCS). Mobile subscribers operating out of range of their home base stations (where they are registered for billing purposes) may originate any class of call via any base station in the system and be billed by the home base station by means of intercommunicating base stations in a Roving Mobile Ticketing System (RMTS). Provision is made for tariff sharing as necessary by participating stations. All call signalling and central signalling is performed out-of-band. Call signalling from any base station to mobiles is common to all radio channels transmitted by that station. Mobiles may be in the standby condition on any radio channel regardless of whether it is in use for communications purposes or not. Mobiles are directed to various channels for communications by the terminal equipment.

21 Claims, 13 Drawing Figures

FIG. 1A. VF BASEBAND BASE-TO-MOBILE

FIG. 1B. VF BASEBAND MOBILE-TO-BASE

FIG. 2A. CALL SIGNALLING BASE-TO-MOBILE AT 200 BAUDS

FIG. 2B. CALL CONTROL SIGNALLING BASE-TO-MOBILE AND MOBILE-TO-BASE

FIG. 2C. ID SIGNALLING FROM MOBILE-TO-BASE

FIG. 2D. BASE STATION CALL SIGN

FIG. 5  RMCS VEHICLE LOCATION POLLED UPDATE SEQUENCE

FIG. 6.  RMTS CALL DATA POLLING SEQUENCE

COMPREHENSIVE AUTOMATIC MOBILE RADIO TELEPHONE SYSTEM

BACKGROUND OF THE INVENTION

The present invention relates to improvements in radio telephone systems.

Several automatic and semi-automatic mobile radio telephone systems have been in operation in many parts of the world for the past few years. The two systems presently most widely used are the Improved Mobile Telephone System (IMTS) described in U.S. Pat. No. 3,351,714, and the Mobile Automatic Telephone System, described by Jochen Wernter in "Mobile Telephone System Calls Long Distance Distances Automatically", Tekade Felten & Guilleume Fernmeldeenlagen GmbH - Nurnberg (Phillips Group), March 1975. These and other systems in present use provide radio telephone service of reasonable caliber to mobile subscribers, in keeping with the requirements and technology available at the time of their inception. The present and projected future demands for more comprehensive subscriber facilities and operating improvements, however, have outstripped the capabilities of those prior systems.

SUMMARY OF THE INVENTION

The system of the present invention overcomes most of the inherent inflexibilities of the above mentioned and other present day systems and provides comprehensive, sophisticated facilities to subscribers and technological flexibility and economy to the operating entities. The system provides complete facilities, similar to those offered to the land-switched telephone network subscriber, to the mobile subscriber. Furthermore, the system may be operated by a number of different cooperating entities without loss of tariffs, but with an increase of traffic handling capability.

In order to optimize the use of the radio channels for communications, out-of-band signalling is used with called-number and channel-code signalling common to all channels; a separate signalling channel is not employed.

Large central control computers are not required, as the base station terminals are interactive, thus, the system may be expanded at any time by the simple addition of further base stations. Automatic mobile call metering is provided by the base station terminals, obviating the need for subscriber loop metering by the interconnecting telephone switching equipment as used in IMTS. All classes of calls can be originated or received by a mobile subscriber automatically at any time, regardless of whether the mobile is operating in its home base station area or not. Metering is provided by a Roving Mobile Ticketing System (RMTS), which provides for billing by the home station and tariff sharing for participating third-party stations, in accordance with the class of call in the area in which it is made.

Automatic transfer of communication from one base station to another, for mobiles communicating while in motion, is provided by an Automatic Communications Transfer System (ACTS).

Roving mobiles, remote from their home base station area, may be called from anywhere in the system by means of a Remote Mobile Call System (RMCS).

The foregoing are some of the major features of the system which jointly provide sophisticated, continuous service, previously unobtainable by mobile subscribers.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF PREFERRED EMBODIMENTS

The invention described herein is an improvement of the system described in my prior U.S. Pat. No. 3,894,194. Many of the concepts and details disclosed therein are referenced in the following description and, to that extent, said prior patent is intended to be incorporated by reference in the description.

SIGNALLING

Prior to explaining the overall system operation, it is essential that the method of signalling and control employed by the system be fully understood.

Figure 1A:
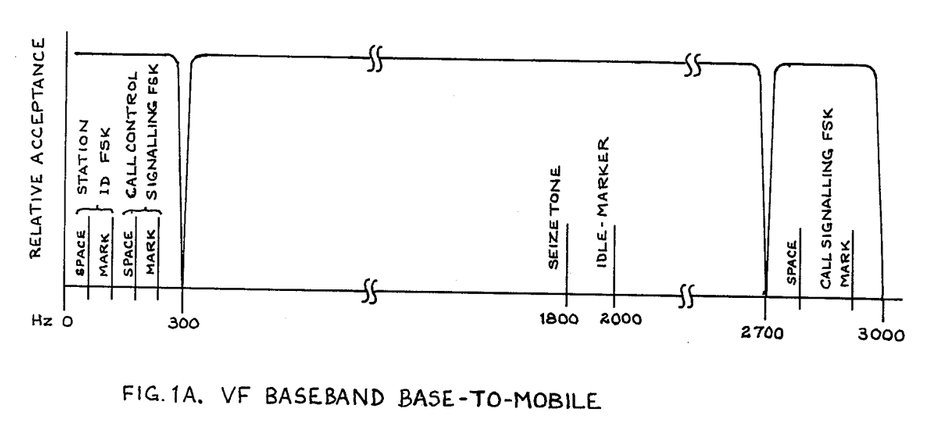
FIG. 1A is a frequency plot of the voice frequency baseband employed in the present invention to transmit signals from base stations to mobile radio telephones.
Figure 1B:
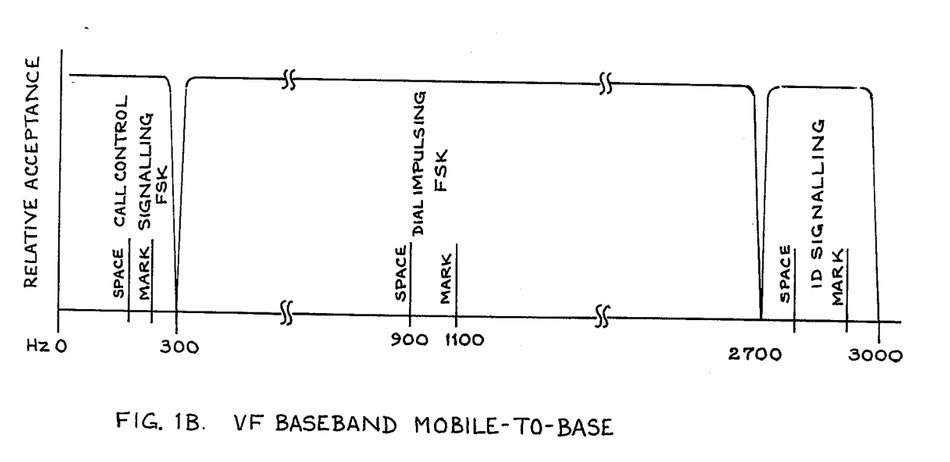
FIG. 1B is a frequency plot of the voice frequency baseband employed in the present invention to transmit signals from mobile radio telephones to base stations.
Figure 2A:
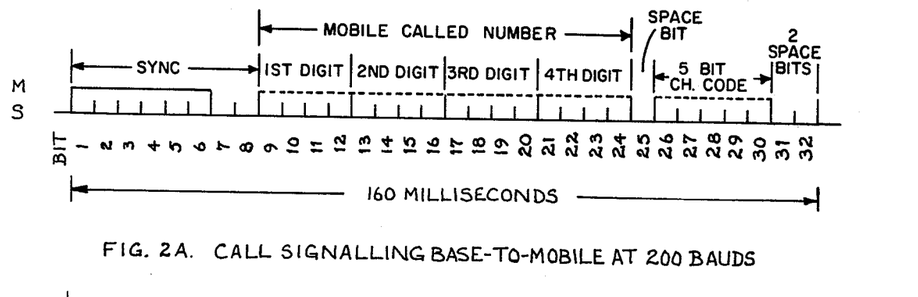
FIG. 2a is a time diagram of the call signalling from base station to mobile as employed in the present invention.
Figures 2B, 2C:
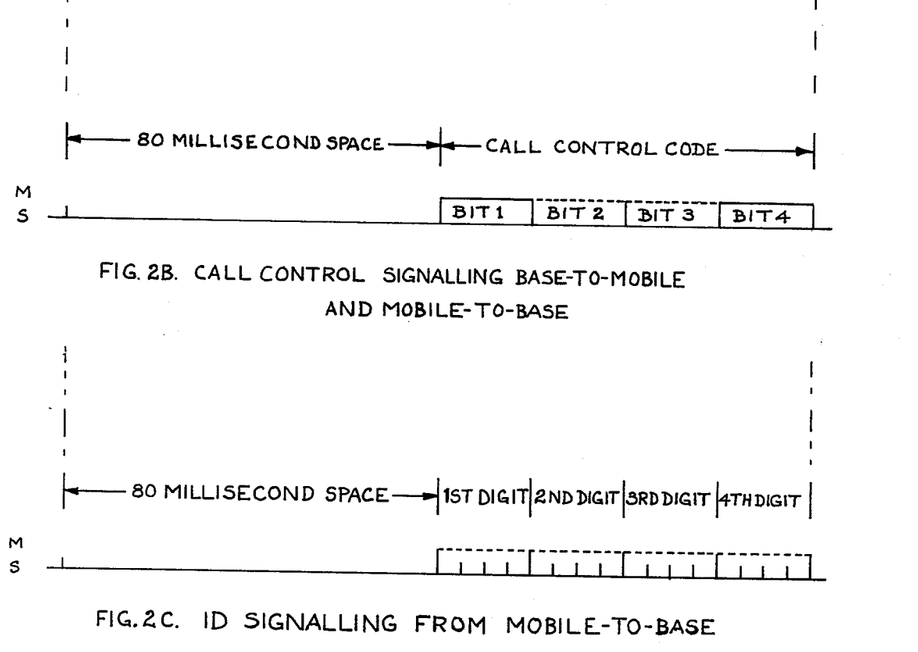
FIG. 2b is a time diagram of the call control signalling employed in the present invention.
FIG. 2c is a time diagram of the Identification Code (ID) signalling from base station to mobile employed in the present invention.
Figure 2D:
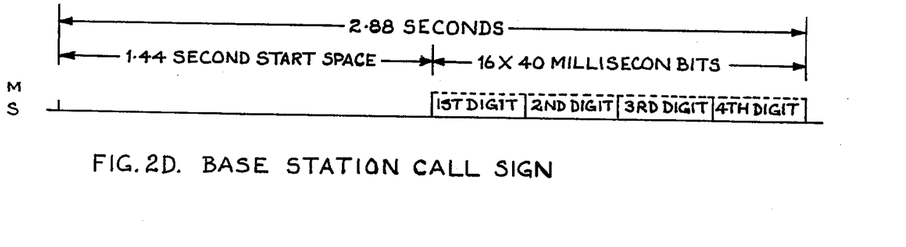
FIG. 2d is a time diagram of the base station /call sign employed in the present invention.

The voice frequency (VF) channel from the mobile to the terminal equipment is divided, by means of filters, into three bands or slots as shown in FIG. 1B. The upper slot (2700–3000 Hz) of each radio channel transmitted by any base station in the system carries the call signalling and channel assignment code for communication to called mobiles. The call signalling is transmitted simultaneously on all radio channels emitted by any particular base station; therefore all mobiles operating in the area served by the base station receive identical call signalling information regardless of the channels to which they are individually tuned. As the call signalling is out-of-band with respect to the voice band (300–2700 Hz), mobiles in a standby condition on channels occupied by other mobiles for communication may also receive the call signalling. Thus by addition of a channel code to the mobile number in the call signal format, a mobile may be directed to switch to another channel for communications if called. Maximum flexibility is therefore attained by switching the mobiles; also, unlike other systems presently in use, a separate radio channel is not required for signalling purposes.

The lower frequency slot (0–300 Hz) is used for control signalling purposes from the terminal to the mobile.

It is not necessary for a mobile to occupy a radio channel if the land subscriber or other mobile called is busy. A busy tone is locally generated by circuitry contained in the mobile radio control head. Likewise if a mobile-to-mobile call is attempted and the called mobile is unobtainable for reasons other than being engaged in communication, an Out-of-Service tone is locally generated in the manner described in my prior U.S. Pat. No. 3,894,194. These tones are activated by receipt of suitable code signals in the control signalling slot. On receipt of such signals the mobile control head switches off the voice channel from the radio receiver, switches on the appropriate tones and releases the radio channel for use by third parties. The tones continue until the handset is replaced on-hook, when the mobile returns to a standby condition.

The control band in the channel transmitted from the terminal to the mobile is used to transmit the Reconfigure command (as described in my U.S. Pat. No. 3,894,194) for single channel mobile-to-mobile operation. The disconnect signal is also transmitted in the control signalling slot.

A slow speed station Identification Code is transmitted by the base station at frequencies below the control signalling data, in the lowest of the three slots shown in FIG. 1A. This signal is common to and transmitted simultaneously on all channels.

Also as illustrated in FIG. 1A, the division of the VF channel includes an upper slot (2700–3000Hz) used for transmission of the mobile identification (ID) number.

A lower slot is used for transmission of control signalling. When a mobile subscriber answers a call, the Off-Hook signal is transmitted to the base station. A Disconnect signal is also transmitted when the mobile subscriber replaces the handset on-hook.

The radio channel Idle-Marker tone (as described in my U.S. Pat. No. 3,894,194) is transmitted in-band by the base station and dial impulses or other suitable call signalling from the mobile-to-base station are also transmitted in-band at the frequencies illustrated in FIG. 1A.

The signalling formats for base-to-mobile and mobile-to-base for the various signals described in the foregoing are shown in FIGS. 2a, 2b, 2c and 2d. For the sake of explanation a call signalling speed of 200 bits per second (bps) is shown with a 32 bit frame having a transmission time of 160 milliseconds. It is possible for other formats, frame lengths and codes other than binary code to be employed. Also for the sake of explanation frequency shift keying (FSK) is employed for all data signalling in both directions and for dial impulsing from the mobile-to-base station.

It should be noted that when the mobile is not signalling in any form, the FSK signalling is switched off completely and no tones are transmitted. However, when the base station is not transmitting information the call signalling remains in the on condition, a Sync signal being transmitted in every frame in the call signalling. The station call sign signalling is continuous regardless of other activity.

Assuming that the mobile ID consists of 4 digits, a nominal 10,000 number, i.e., a system of ten thousand mobiles is possible. The call signalling format consists of an 8-bit Sync code of six mark (binary "1") bits and two space (binary "0") bits. Hexadecimal code is used for all ID digits 0–9, the digit 0 being transmitted as "H" 10. Thus the Sync code may not be duplicated by any combination of these digits. A five-bit channel code providing for thirty-two channels may be used with this Sync code provided a single space bit exists between the final bit of the ID number and the channel code. Larger numbers of channels may be used if other Sync codes are employed, generally requiring a larger frame for total signalling than the 32 bits used in this explanation.

The 4-bit call control signalling both from the base-to-mobile and from mobile-to-base is preceded by an 80 millisecond space tone providing sufficient time for FSK receivers to lock onto the signal. The mobile-to-base ID signalling has an 80 millisecond space signal followed by 16 bits at 200 bps. The following table shows the four-bit control signalling codes from base-to-mobile;

| Control Signal | Binary Format |
| --- | --- |
| Disconnect | 1111 |
| Busy | 1001 |
| Out of Service | 1011 |
| Reconfigure | 1101 |

(Logic 1 = mark
Logic 0 = space)

The following table shows the four-bit control signalling codes from mobile-to-base:

| Control Signal | Binary Format |
| --- | --- |
| Disconnect | 1111 |
| Off-Hook | 1001 |

Dial impulses from the mobile to the base station are transmitted via FSK. The Off-Normal contacts of the rotary dial operate to start emission of a space tone when the dial is wound up. A mark signal is then transmitted corresponding to each dial impulse. The space signal at the start of each dial impulse train provides sufficient time for the FSK detectors to lock out the received signal prior to decoding the impulses.

Other forms of signalling such as dual-tone-multi-frequency (DTMF) signalling are possible in place of rotary dial signalling, as described in my U.S. Pat. No. 3,894,194.

SYSTEM CONFIGURATION

Figure 3:
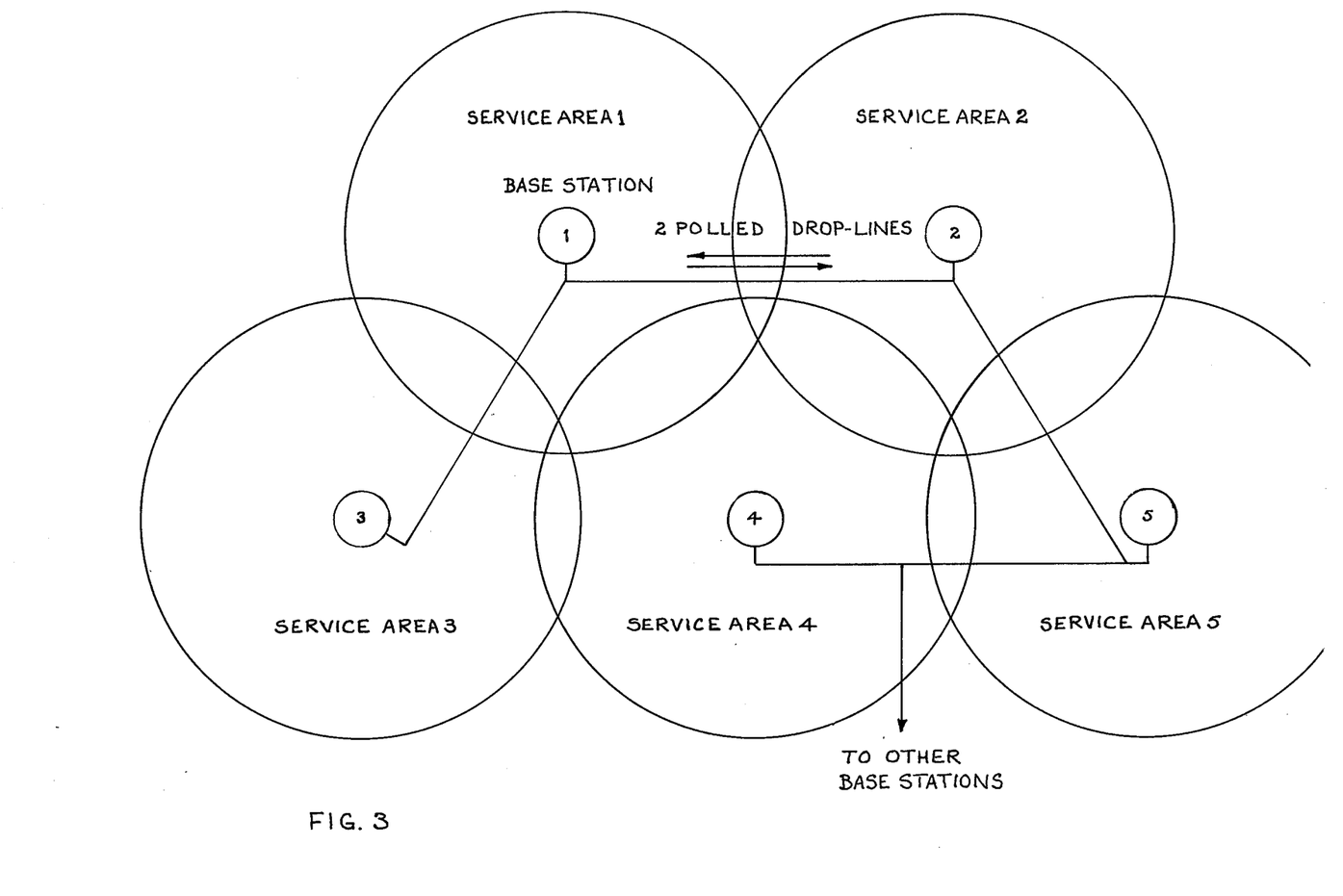
FIG. 3 is a diagram illustrating interconnection between base stations in accordance with the present invention.

The essential functional units of a system providing RMTS and RMCS facilities are shown in FIG. 3.

All mobiles operating in the system are registered at one of the base stations 1, 2, 3, 4, 5, etc., in the system for billing purposes and permanent registration purposes. Each base station contains subscriber meter circuits (as described in my U.S. Pat. No. 3,894,194) whose preset numbers correspond to the registered mobiles at that station. These meter circuits may be added or removed at any time when the number of mobiles in the system is increased or decreased. The meter circuits provide the necessary static record of the mobiles operating in the system.

Figure 4:
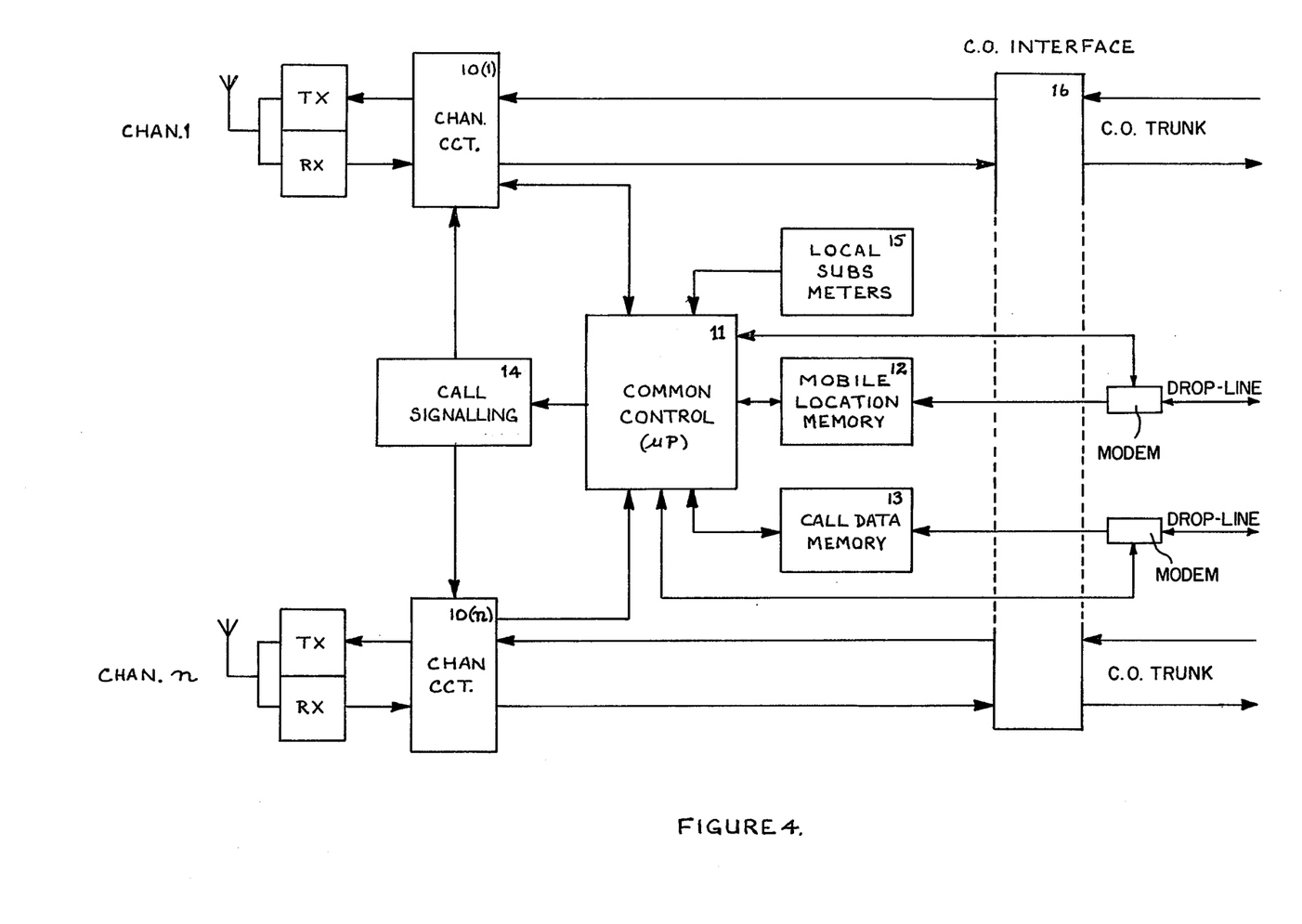
FIG. 4 is a functional block diagram of the essential elements of a base station according to the present invention.

FIG. 4 illustrates the basic functional elements of each base station 11. A channel circuit 10(1) through 10(n) exists at the base station for all n channels and is similar to that described in my U.S. Pat. No. 3,894,194. Signals to be transmitted by or received at the base station pass through these channel circuits. A common control unit, in the form of a commercially available microprocessor 11 controls the sequencing of all operations at the base station. Each base station further includes a mobile location memory 12, a call date memory 13, a call signalling unit 14 and local subscriber meter circuits 15 (of the type described in my U.S. Pat. No. 3,894,194), each of which functions in the manner described subsequently. A central office interface 16 connects each channel to a corresponding central office trunk line. The mobile location memory 12 is connected by means of a polled drop-line to mobile location memories of other base stations. One of the base stations is designated as the master station as far as the location memory polling is concerned and controls the sequential polling of all the stations. As far as the mobile call memories 13 are concerned, they are also connected by means of a polled drop-line in a similar manner to the mobile location memories. These two data channels may be multiflexed if required so that only single drop-line may be employed.

SYSTEM OPERATION

Assume that a mobile in the standby condition, and having a home base station (1) enters service area 3. Upon losing the signal from base station (1) the mobile automatically hunts for an active block of channels. After receiving the new call sign from call signalling circuits 14 at base station (3) the mobile automatically seeks an idle channel, seizes it and sends its ID code accompanied by a Disconnect control signal. The base station (3) automatically repeats the ID after receipt of which, if correct, the mobile transmits a second Disconnect signal and returns to the standby condition. The base station then switches the 2000 Hz Idle marker on again and returns the channel to its original idle condition. If the ID code retransmitted by the base station is incorrect the mobile repeats the procedure until correct identification is established. It should be noted that the number of identification attempts are limited as the average signal level of the channel is continuously monitored by the mobile, in both operating and standby condition, and the loss of signalling or inability to synchronize will cause the mobile to hunt for a channel with improved signalling.

The transmission by the mobile of the ID code plus a simultaneous call control Disconnect indicates to the base station that automatic registration is required and that there is no call origination attempt by the mobile. Base station (3) automatically checks its own number allocation among the subscriber meters for the received ID code. The base station (3) will not find the ID code for the mobile among its own subscriber meters; thus the ID code for the mobile is stored temporarily in the mobile location memory 12. All base stations, including base station (3), are periodically polled and respond with the newly registered mobile ID codes. All other base stations in the system receive the response and temporarily store the mobile ID in their respective location memories. Each base station then interrogates its respective subscriber meters 15. Only the mobile subscriber meter corresponding to the particular mobile at station (1) will find the ID code for the mobile. Station (1) transmits an acknowledge signal at a predetermined time after the response to polling by station (3). The station number for base station (3) is stored in the location memories of all base stations in conjunction with the ID number of the mobile thus establishing the temporary location of the mobile. If no response is received from any station at the Acknowledgement time, it is an indication that the mobile is not registered in the system; the number entry in all location memories is then erased.

From the foregoing it is noted that all mobiles operating in the system are temporarily registered at one of the base stations; all other base stations are aware of each mobile location.

When a call is originated and completed by a mobile, the base station through which the call is made compiles the necessary data for billing purposes in the Mobile Call Data Memory 13. If the mobile is not registered at the particular base station through which the call was made, the data is made available on the call-data drop line when the base station is polled. The station at which the mobile is permanently registered, i.e., at which the mobile subscriber meter is located, acknowledges the transmission of the mobile ID code as the preamble to the call data. The polled station then proceeds to transmit the remainder of the call data for that call using normal data transmission means via the drop-line. Thus it may be seen that correct billing from the home base station is facilitated and tariff sharing provided as necessary.

Figure 5:
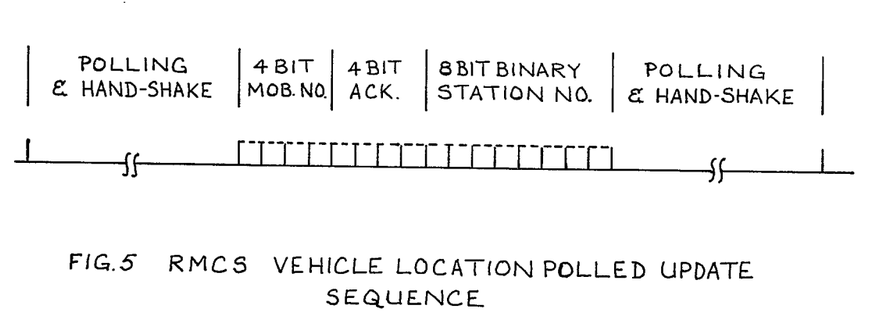
FIG. 5 is a timing diagram of the mobile location update polling sequence according to the present invention.

FIG. 5 illustrates the polling sequence format which is employed for updating the mobile location memory via the data drop-line. The polling and handshake routine at the commencement of the cycle varies according to the type of modems employed in the system. The four-bit acknowledgement signal from the home base station of the relocating mobile may take any desired form as its sole purpose is to acknowledge the fact that the specific mobile has an active subscriber meter in the system. The eight-bit binary station number is an arbitrary number assigned to the base station within the system and unique to that base station. This number may be represented by more or less bits according to the size of the system and the total number of base stations contained therein.

Figure 6:
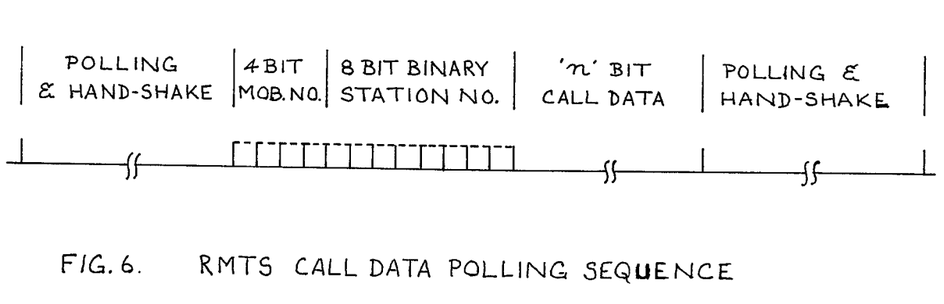
FIG. 6 is timing diagram of the call data polling sequence according to the present invention.

FIG. 6 shows the basic polling format for the call-data information system via the drop line between base stations. The format is very similar to that used in RMCS vehicle location update operation; the difference being that the call data portion of the format lasts very much longer.

RMCS CALL SEQUENCES

LOCAL LAND-TO-MOBILE CALL

A local land subscriber accesses the base station by dialing the three digit office code representing the local central office of the land telephone network interconnecting with the base station. The final four digits of the total seven digits dialed by the calling subscriber are the mobile numbers. The local base station terminal compares the dialed mobile number with numbers in its mobile location memory 12. It should be noted that all entries in the location memory 12 will have already been verified against operating subscriber meter circuits as described above. If the mobile is operating locally in this case, the mobile number will be present in the mobile location memory. The call signal unit 14 then transmits the four digits of the called mobile in the call signalling slot common to all radio channels, accompanied by the channel code corresponding to the radio channel associated with the interconnecting telephone trunk on which the call is being made. The idle marker tone is removed from the channel.

The called mobile decodes the four-digit signalling and switches to the indicated channel. When tuned to that channel the mobile transmits its ID code to the base station and ringing commences in the mobile telephone set. The terminal generates local returned ringing signal which is transmitted to the calling land subscriber via the telephone circuit.

When the mobile subscriber answers the call by lifting the handset off-hook a call control signal is transmitted via the lower control signalling band or slot, indicating the off-hook condition. Local ringing at the mobile is switched off and returned ringing to the calling subscriber ceases. The VF channel is then open for communication. At the end of the call either subscriber can release the circuit by replacing the handset on-hook which generates a Disconnect control signal from either the terminal or the mobile accordingly. The mobile remains on the radio channel in the standby condition.

LAND TO MOBILE CALL WITH MOBILE OPERATING REMOTELY

A land subscriber accesses the base station in the normal manner by dialing either a seven or ten-digit number (area code used in latter case). The final four digits of the number dialed are used by the terminal as described above, for comparison with the contents of mobile location memory 12. Assume that the memory shows that the called mobile is operating remotely in another base station area. The remote base station number (eight-bit binary number) corresponds to an area code and office code from an access standpoint. Each base station has a number of automatic recorded messages, each message corresponding to the number of one of the other base stations in the system. The recording is accessed for the acquired base station and instructs the calling subscriber to "dial area code $x\,x\,x$" (if applicable), office code $xxx$ and (the final four digits of his mobile number). Inasmuch as this would be an incomplete call at this point no call charge is applied. Access to the mobile is then accomplished by automatic direct dialing via the land telephone network through the remote base station.

MOBILE TO MOBILE AT SEPARATE LOCATIONS

When a mobile to mobile call is originated and the two mobiles are located in two separate base station service areas, the call is routed automatically. Depending on the numbering scheme allotted by the interconnecting land telephone company, an access code may be or may not be required. If a particular numbering scheme is provided the terminal equipment at the base station can be made to recognize any mobile number in the system by either hardware or software. It is beyond the scope of this description to enumerate the prerequisites for such a scheme. Alternatively a single or multiple digit access code may be used in conjunction with the last four digits of the mobile number. The terminal would recognize the access code and route the call accordingly. Assuming that, by one or the other method, the base station terminal has recognized that the call being attempted is a mobile to mobile call, it immediately checks the mobile location memory. The mobile location memory indicates that the called mobile is operating remotely in a base station area designated by the eight-bit binary station number. The area code, if applicable, and office code of the remote station stored in the program memory of the station and are accessed. The area code, if applicable, and office code are outpulsed with the called mobile number automatically to the land telephone system. The called mobile is then automatically called in the same manner as a land to mobile call, no recorded messages are required.

For land to mobile calls where the mobile is operating remotely from the accessed base station, automatic rerouting of the call is possible where automatic rerouting equipment is installed in the land telephone central office. In this case recordings and re-dialing are not necessary.

MOBILE CONTROL HEAD CONFIGURATION

Figure 7:
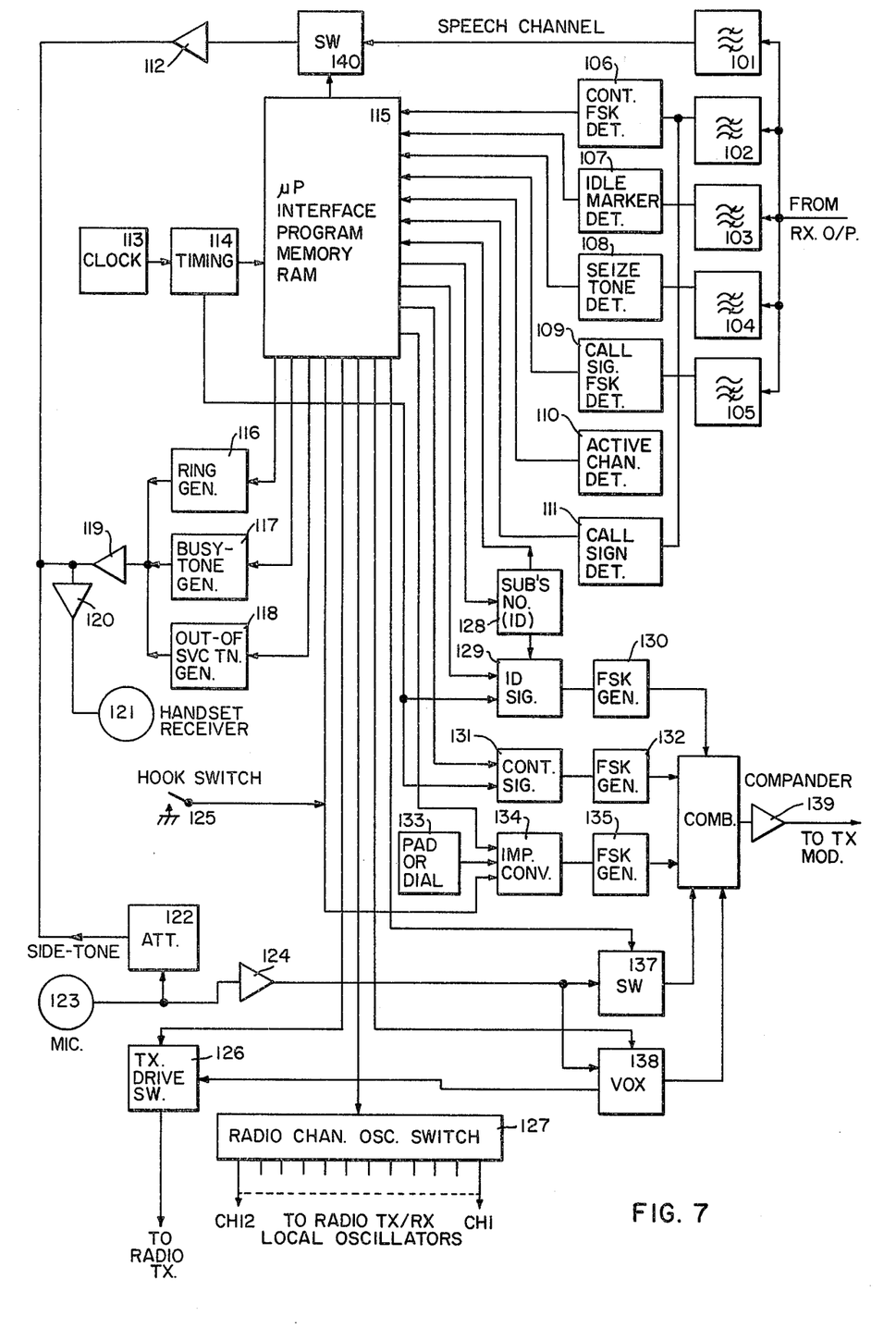
FIG. 7 is a functional block diagram of a mobile transmitter-receiver according to the present invention.

FIG. 7 is a functional block diagram of the mobile control head used in the system and which is connected to a full duplex radio transceiver. The control head is controlled by microprocessor 115, the control program being flexible enough to encompass variations from a standard operational system.

The radio receiver VF output is connected to filters 101 through 105 which split the baseband as shown in FIG. 1A. Bandpass filters 103 and 104 pass only the 2000 Hz Idle Marker tone and the 1800 Hz Seize tone. The outputs of the filters are taken to the various detectors 106 through 111 and the speech channel. All detection outputs are interfaced with the microprocessors 115 and the various desired signals are handled by software. The voice channel send and receive operation is controlled by the two switches 137 and 140, respectively. These switches are controlled in turn by the microprocessor 115. The various operating tones, Ringing, Busy-Tone and Out-of-Service Tone are locally generated by the control head and switched on and off by the microprocessor 115. Sidetone is provided via the alternator 122 which is a unidirectional device preventing the operating of tones from being fed into the transmission path.

The subscriber number circuit 128 provides a four-digit number in binary form set by switches. This circuit is connected both to the microprocessor 115 interface for comparison with the called number received via the call-signalling FSK detector 109, and to the ID signalling circuit 129 where it is transmitted directly as required in serial form as the mobile ID. The ID signalling is transmitted via FSK generated by the FSK generator 130. The FSK generator 130 is only switched on when required for ID transmission and is switched off again at the end of the transmission.

The control signalling 131 provides the necessary timing and codes generated by the microprocessor for FSK transmission via the FSK generator 132. The FSK generator 132 is only switched on for the duration of a control signal transmission. Only two control signals are necessary for transmission by the mobile to the base station, i.e., Off-hook and Disconnect. All control signals to and from the mobile are four-bit codes. The disconnect code is 111 and the off-hook code is 1001.

Dial impulses are also transmitted by FSK to the control terminal. Other forms of signalling may be used as required. The dial impulse FSK generator 135 is switched in by the off-normal contacts of the dial when it is wound up and will switch off again at the end of the impulse train. The wind-up time of the dial is sufficient time for the dial impulse detector in the terminal to lock onto the space-tone transmitted during this interval. FIG. 7 shows an impulse converter 134 with an entry or dial pad 133. This arrangement allows the convenience of push-button entry of digits and the reliability of dial impulse transmission. The impulse converter 134 can accept digit inputs at any reasonable speed from the entry pad 133 but will only outpulse the dial impulses at a standard rate.

The outputs of the three FSK generators 130, 132, 135, and the transmission speech channel output from either the switch 137 or the VOX138 are combined in the electronic combiner 136, followed by the compender 139 which supplies a constant signal amplitude to the radio transmitter. The VOX138 is switched into circuit when a mobile to mobile call is made via the same base station. The four-bit channel code received with the called number when the mobile is called is latched into the Radio Channel Oscillator Switch 137 which is basically a four-bit-binary-to-one-of-twelve line decoder.

The mobile when operating in the system, may be in standby on any channel transmitted from the base station whether it is busy or not. A called mobile is directed to the channel to be used for communication by the four-bit binary channel code shown in the signalling format in FIG. 2b.

AUTOMATIC COMMUNICATIONS TRANSFER SYSTEM (ACTS)

In a multi-channel mobile radio telephone system with multiple base stations covering a large geographical area, mobiles may move freely from area to area during communication with the land telephone network or other mobiles and be automatically switched from one base station to another during conversation, as the communicating mobile physically moves out of one area into another.

The decision to switch from one base station to another for communication is based on a trend of deteriorating signal-to-noise ratio (S/N) rather than instantaneous measurement. Switching is achieved very rapidly so that no speech is lost and the changeover may even go unnoticed by the correspondents.

ACTS SIGNALLING

The signalling from the base station to the mobile is out-of-band in the 2700–3000 Hz slot shown in FIG. 1a. The command from the base station to switch channels appears as calling signal, i.e., mobile four digit number (in a 10,000 mobile system) and a channel code. The mobile is however already in communication and thus will recognize the signalling as a command to switch channels. Channel switching takes place directly following the channel code transmission and thus the mobile is able to receive the sync format at the start of the new frame of signalling on the new channel. The signalling is common to all channels thus the signalling frame start, 8 bit sync, will appear at the same time on all channels.

On arrival on the designated channel the mobile transmits its identification (ID) code. On receipt of the mobile ID the base station recognizes that the necessary communications transfer has taken place and the radio channel previously used for communications via the other base station can now be released for use by third parties

ACTS OPERATION

Figure 8:
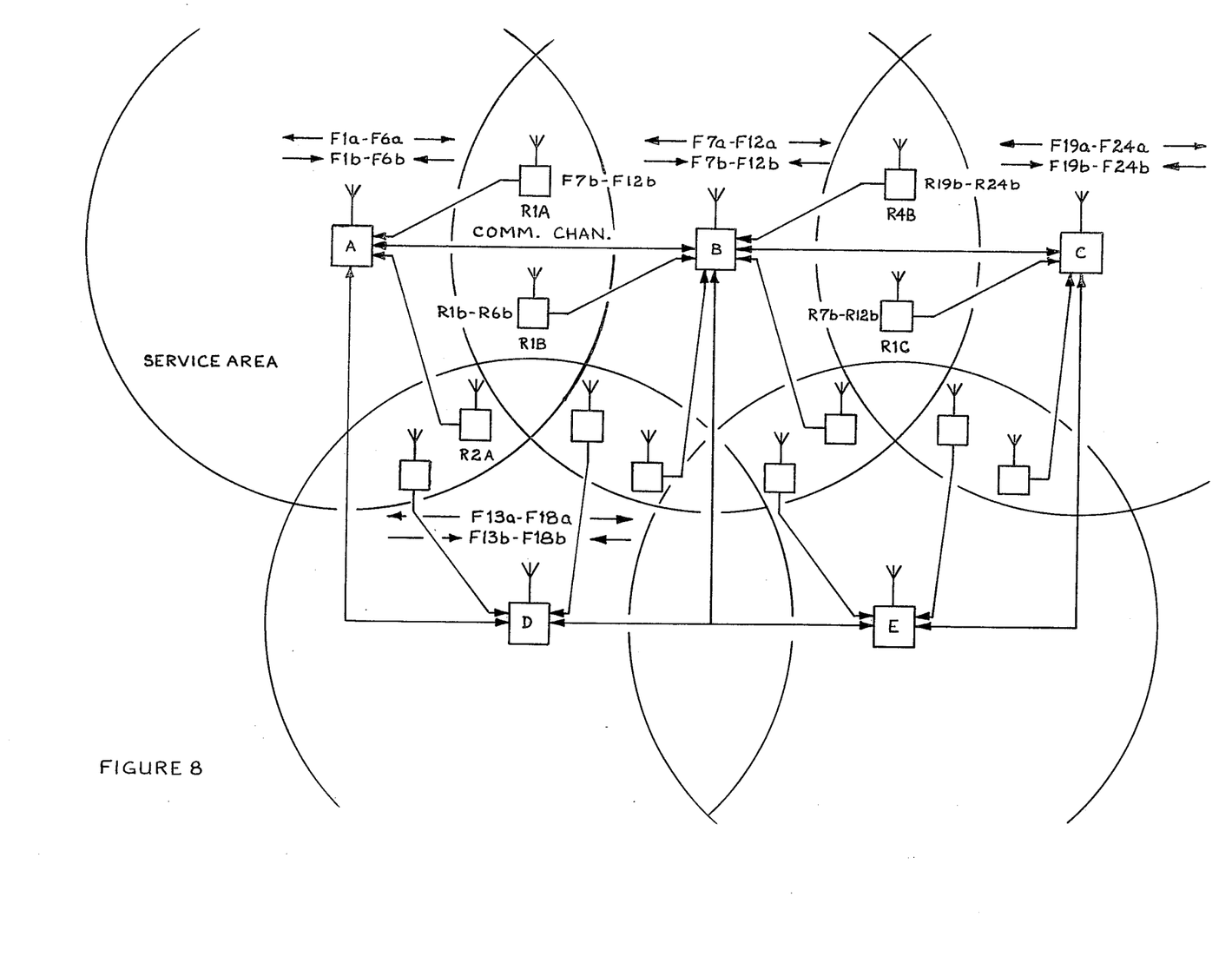
FIG. 8 is a diagram illustrating interconnections between base stations in accordance with the automatic communications transfer portion of the system.

FIG. 8 shows the essential system components for a multi-channel multiple base station system using the Automatic Communications Transfer System.

The diagram shows a system in which each base station operates with six radio channels. The service areas of each base station overlap so that continuous radio coverage is provided. Base station A has two remote receiver stations R1A and R2A situated approximately on the fringe of its service area. The receivers at R1A are tuned to frequencies F7b through F12b which are the receive frequencies of base station B. Similarly station R2A receivers are tuned to F13b through F18b which are the receive frequencies of base station D. Conversely base station B has a receiver station R1B situated approximately on the fringe of its service area, tuned to frequencies F1b through F6b which are the receive frequencies of base station A.

The receivers R1A, R2A and R1B are connected to base stations A and B, respectively, by normal communications channels. Base stations A, B and D are connected together also by communications channels.

The outputs of the receivers at base station A and the satellite receivers R1B which are tuned to the same frequencies (F1b through F6b), are connected to a receiver voting comparator at the base station which operates according to the S/N ratio of the received signal from either receiver. The voting equipment used in its common application would select the best signal from the two receivers on the basis of S/N ratio and mute the other receiver. The receivers operate in a similar manner in this configuration with the additional feature that each time voting takes place the output of the comparitor is stored, thus over a period of time, selected according to the application and propagation variations in the system, a trend is platted. For example, if a mobile in motion, in communication with a third party via base station A travels towards base station B the outputs of the base station receiver at A will probably be selected by the voting equipment more frequently than those at R1B when the mobile is in the vicinity of base station A. However as the mobile approaches the fringe of service area A, the probability of selection by the receiver at R1B will increase because of proximity to that station. It will be seen then that if the voting selections are recorded and measured against time a directional trend will become apparent. The system can be programmed to effect switching of communications from base stations A to B when the voting ratio for the two receivers (the receiver at A and the receiver at R1B) reaches a predetermined value in a given time span.

The voting trend is recorded at base station A and the information is also transmitted via the communications channel to base station B. As the critical ratio is approached B will select one of the channels F7 through F12 for communications by the mobile if required. The point at which the channel is selected will be a function of the speed with which the trend emerges and the probability of a channel being available at the projected time of transfer. At the time of selection just prior to the communications transfer station B will remove the Idle marker from the channel in preparation for the switch over. The selected channel number, i.e., channel code, will be transmitted to base station A which in turn will seize a transfer communications channel between A and B to which the communicating third party will be switched at the time of transfer.

When the decision by A is made to transfer the call the mobile's four digit number and the channel code for the channel at B are transmitted via the call signalling channel. Simultaneously base station A transmits a switching code to base station B. Station B will then expect to receive the mobile ID in the following signalling frame. All base stations in the system are synchronized regarding signalling via the communications channel. The mobile, on receipt of the call-signalling will decode its number and the channel code. Already being in communication, the mobile recognizes the signalling as a transfer command and immediately switches channels. Just prior to the communications transfer the voice channel in both directions is activated via base station B so that for a short period of time the same transmission is present from both stations A and B although only one of the stations receives the mobile. Directly after switching channels the mobile transmits its ID out of band in the 2700–3000 Hz slot and base station B recognizes that the transfer has been completed. Base station A is signalled by B and the original radio channel is disconnected and marked idle for communications by other mobiles.

If the mobile does not switch channels for some reason, e.g. poor propagation at the moment of signalling from A no ID is received by B, Base station B immediately transmits this information to A which re-signals the mobile until the transfer is effected.

The number of satellite receiver stations employed by any one base station depends on the physical configuration of the system.

The communications channels between base stations in the system have two primary functions. The first function is the transmission of voting and transfer data and the second is to provide a voice channel, in the case of communication between a mobile and land subscriber, from the point of interface with the land telephone system and the second base station, station B, in the example given. In the case of mobile to mobile communication the channel connects the two base stations together, hence the radio channels used by the mobiles at each station. This second function of the communications channel can be provided by the land telephone network if automatic call transfer re-routing equipment is included at the interconnecting switching center. The transferring base station can then provide the necessary re-routing information to the land telephone network for the transfer to take place. However, it should be noted that it will be necessary for a dual transmission path to be provided by the land telephone network for a short period during the transfer operation to avoid loss of communications even momentarily by the communicating subscribers. In the case of a mobile to mobile call the base station to base station channel could be accomplished via the land telephone system by automatic dial-up. A dual radio transmission path would present no problems as there would be no transfer routing involved if adjacent stations were in use.

On the basis of dedicated communications channels the number of channels required would normally be calculated on the basis of a traffic study and application of the Erland C formula.

The data channel between base stations would normally be multiplexed onto one of the voice channels.

ACTS BASE STATION CONFIGURATION

Figure 9:
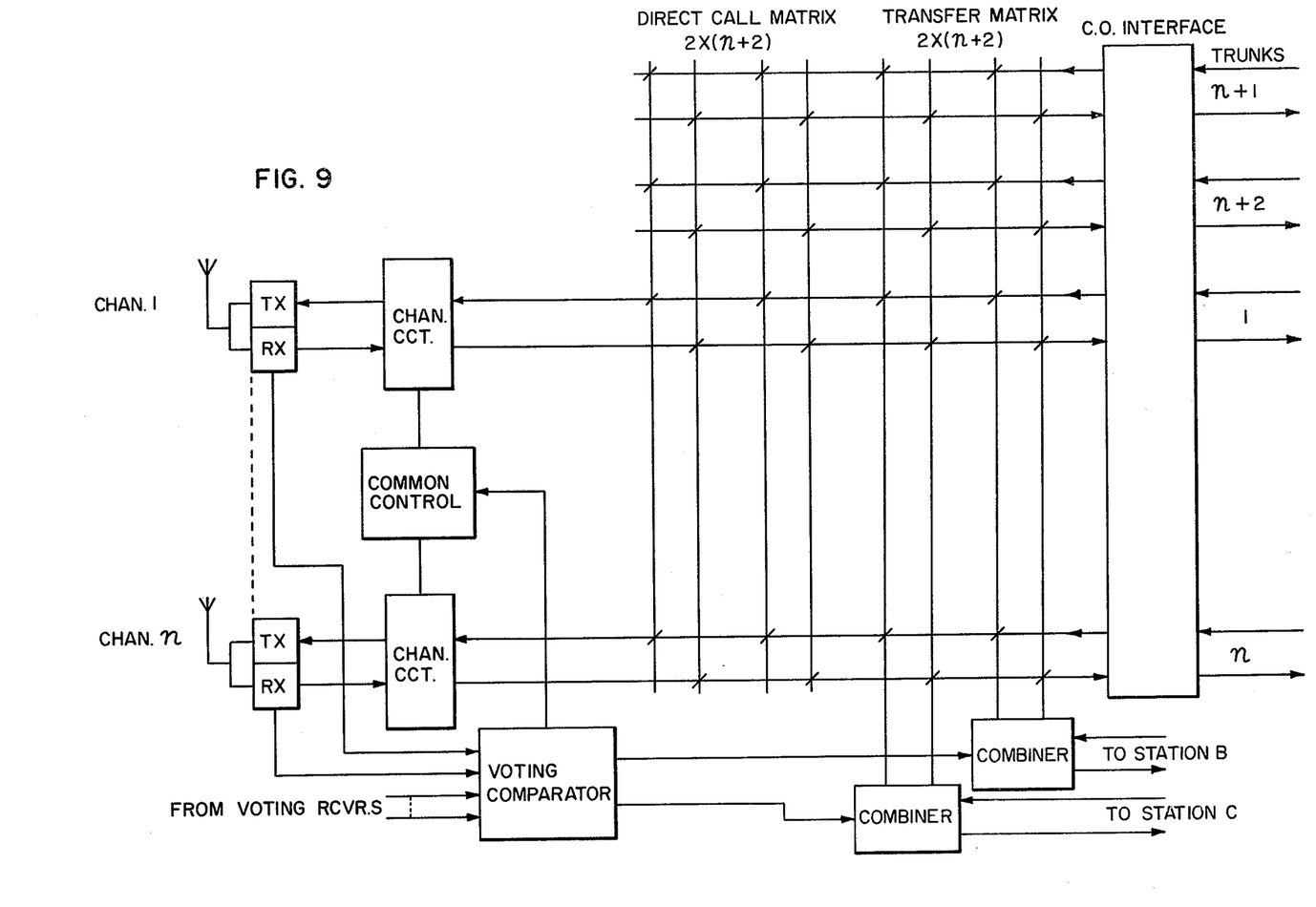
FIG. 9 is a functional block diagram of the essential elements of a base station employed in the automatic communications transfer embodiment of the system.

In addition to the normal station terminal equipment additional circuitry is required to provide the functions for automatic communications transfer. FIG. 9 shows a typical base station configuration for operation with $n$ radio channels and two communications transfer channels.

Inasmuch as there are two transfer channels there must also be two additional interconnecting central office trunks if the base station facility is to retain full operational capability after transfer. During normal operation with no transfers in hand the two interconnecting trunks $n + 1$ and $n + 2$ will be busied out to prevent attempted calls from the land network.

When a transfer takes place involving a land subscriber the trunk being used will be connected to two interbase-station communications channels by means of the $2x$ $(n+2)$ transfer matrix switch. One of the two additional trunks, $n + 1$ or $n + 2$ will be brought into service and the busy-out removed. The direct call matrix will automatically connect the spare trunk to the channel from which the transfer was effected so that traffic may now pass to and from the trunk if required via that specific radio channel.

When the trunk involved in the transfer is released that trunk will now become a spare and be busied out. Thus at all times the base station may utilize all radio channels whether a transfer is in operation or not.

A further use for the system in conjunction with mobiles located in the regions covered by more than one base station is automatic transfer at times of traffic congestion, e.g. busy hour. This facility is quite easily handled by the software of the base station common control microprocessors.

In all cases tariff sharing may be effected as necessary.

While I have described and illustrated one specific embodiment of my invention, it will be clear that variations of the details of construction which are specifically illustrated and described may be resorted to without departing from the true spirit and scope of the invention as defined in the appended claims.

I claim:

1. A multi-channel mobile radio telephone system of the type wherein mobile stations are capable of initiating and receiving calls to and from other mobile stations and stations in a public telephone system, wherein a base station serves as a relay link for all calls and is capable of transmitting and receiving calls via each of said channels, wherein a plurality of mobile stations are each individually tunable to respective channels for purposes of transmitting and receiving signals during calls, wherein each channel comprises a modulation band of audio frequencies modulating a respective carrier frequency, said system being characterized in that each modulation band is divided into at least two frequency sub-bands, a first of said sub-bands being reserved for voice communications, a second of said sub-bands being reserved exclusively for control and supervisory signalling, and further including means at said base station for transmitting said control and supervisory signals in said second sub-band of all said channels simultaneously.

2. The system according to claim 1 wherein a modulation band transmitted from each mobile to a base station is divided into three sub-bands as follows: said first sub-band being reserved for voice communication; said second sub-band being reserved for control and supervisory signalling; and a third sub-band being reserved for transmitting mobile identification signals; and wherein said first sub-band is disposed between said second and third sub-bands.

3. The system according to claim 2 wherein a modulation band transmitted from a base station to mobile stations is divided into three sub-bands as follows: said first sub-band being reserved for voice communications; said second sub-band being reserved for control and supervisory signalling; and a further sub-band being reserved for transmitting base station identification and additional control signals to said mobile stations; and wherein said first sub-band is disposed between said second and further sub-bands.

4. The system according to claim 2 further comprising:
   channel marker means at each base station for transmitting an idle marker tone on each channel on which no call is in progress, said channel marker tone being in said first sub-band of the modulation band transmitted by each base station; and
   selectively actuable call-initiating means at each mobile station for automatically seizing a channel on which no call is in progress whenever said call-initiating means is actuated.

5. The system according to claim 1 wherein a modulation band transmitted from a base station to mobile stations is divided into three sub-bands as follows: said first sub-band being reserved for voice communications; said second sub-band being reserved for control and supervisory signalling; and a further sub-band being reserved for transmitting base station identification and additional control signals to said mobile stations; and wherein said first sub-band is disposed between said second and further sub-bands.

6. In a multi-channel mobile radio telephone system of the type wherein mobile stations are capable of initiating and receiving calls to and from other mobile stations and stations in a public telephone system, wherein a base station serves as a relay link for all calls and is capable of transmitting and receiving calls via each of said channels, wherein a plurality of mobile stations are each individually tunable to respective channels for purposes of transmitting and receiving signals during calls, and wherein each channel comprises a modulation band of audio frequencies modulating a respective carrier frequency, the method of signalling comprising the steps of:
   at each of said mobile stations, filtered received signals to divide said modulation band into a voice communication sub-band and a control signalling sub-band;
   at said base station, transmitting control signals in said control signalling sub-band of all of said channels simultaneously.

7. In a multi-channel mobile radio telephone system of the type wherein mobile stations are capable of initiating and receiving calls to and from other mobile stations and stations in a public telephone system, wherein plural base stations service respective plural geographic areas as relay links for all calls and are capable of transmitting and receiving calls via each of said channels, each base station having multiple mobile stations assigned thereto, the base station to which a mobile station is assigned being designated the home base station for that mobile station, and wherein a plurality of mobile stations are each individually tunable to respective channels for purposes of transmitting and receiving signals during calls, a method whereby a mobile station may move from one geographical area to another and out of radio range of its home base station and yet initiate and receive calls with other mobile stations and with stations in said public telephone system, said method comprising the steps of:
   at each base station, transmitting a call sign signal, unique to that base station, to all mobile stations within the geographic area served by said each base station;
   upon each mobile station leaving the geographic area served by its home base station and failing to receive from its home base station said call sign signal at least at a predetermined threshold level, automatically seeking and seizing a channel on which a call sign signal is transmitted from another base station;
   transmitting, from said each mobile station to said another base station on said seized channel, an identification signal which is unique to said each mobile station;
   storing at said another base station a signal identifying said each mobile station;
   transmitting, from said another base station to all other base stations in said system, another signal identifying the geographic area served by said another base station as the location of said each mobile station.

8. The method according to claim 7 further characterized in that the call metering for said mobile stations is automatically effected irrespective of in which geographic area a mobile station happens to be located, wherein each base station includes a meter circuit for each mobile station it serves as a home base station, said method further comprising the steps of:
   upon completion of a call by said mobile station at said another base station, transmitting from said another base station to all other base stations a code signal representing the identity of said mobile station;
   upon receipt of said code signal at the home base station of said mobile station, transmitting an acknowledgement signal from said home base station to said another base station; and
   upon receipt of said acknowledgement signal at said another base station, transmitting call data for the completed call from said another base station to said home base station.

9. The method according to claim 7 further comprising the steps of:
   at each base station, storing the current location of the geographic area of at least all of the mobile stations assigned to said each base station as a home base;
   upon receiving a call at said base station from a station in said public telephone system for a mobile station assigned to that base station, determining whether the called mobile station is located in a geographic area served by some other base station;
   if said called mobile station is located in a geographic area served by some other base station, transmitting a recorded message to the calling party indicating the telephone number which must be dialed to reach said called mobile station through said other base station.

10. The method according to claim 7 further comprising the steps of:

at each base station, storing the current location of the geographic area of at least all of the mobile stations assigned to said each base station as a home base;

upon receiving a call at said base station for a mobile station assigned thereto from another mobile station, determining whether the called mobile station is located in a geographic area served by some other base station;

if said called mobile station is located in a geographic area served by some other base station, automatically routing the call through a base station serving a geographical area in which the called mobile station is located.

11. In a multi-channel mobile radio telephone system of the type wherein mobile stations are capable of initiating and receiving calls to and from other mobile stations and stations in a public telephone system, wherein plural base stations each have a different plurality of mobile stations assigned thereto and serve as relay links for all calls and are capable of transmitting and receiving calls via each of said channels, wherein a plurality of mobile stations are each individually tunable to respective channels for purposes of transmitting and receiving signals during calls, a method permitting mobile stations to continue with calls in progress uninterruptedly as that mobile station travels beyond the range of a first base station and into the range of a second base station, said method comprising the steps of:

periodically transmitting specified signals from first base station to all other base stations in said system, said specified signals identifying the transmitting base station and all mobile stations currently being served by said first base station which are not assigned thereto; and automatically switching telephone calls in progress from being relayed by said first base station to being relayed by said second base station when a mobile station involved in such calls moves out of range of said first base station and into range of said second base station.

12. The method according to claim 11 wherein control and supervisory signals are transmitted by said base stations to said mobile stations on all of said channels simultaneously irrespective of whether calls are in progress on such channels or not.

13. The method according to claim 11 wherein the step of automatically switching telephone calls includes the steps of:

at each base station, transmitting a call sign signal, unique to that base station, to all mobile stations within the geographic area served by said each base station;

upon each mobile station leaving the geographic area of the base station to which it is assigned and failing to receive from that base station said call sign signal at least at a predetermined threshold level, automatically seeking and seizing a channel on which a call sign signal is transmitted from another base station;

transmitting, from said each mobile station to said another base station on said seized channel, an identification signal which is unique to said each mobile station;

storing at said another base station a signal identifying said each mobile station;

transmitting, from said another base station to all other base stations in said system, another signal identifying the geographic area served by said another base station as the location of said each mobile station.

14. The method according to claim 13 further characterized in that the call metering for said mobile stations is automatically effected irrespective of in which geographic area a mobile station happens to be located, wherein each base station includes a meter circuit for each mobile station it serves, said method further comprising the steps of:

upon completion of a call by said mobile station at said another base station, transmitting from said another base station to all other base stations a code signal representing the identity of said mobile station;

upon receipt of said code signal at the base station to which said mobile station is assigned, transmitting an acknowledgement signal therefrom to said another base station; and upon receipt of said acknowledgement signal at said another base station, transmitting call data for the completed call from said another base station to said base station to which said mobile station is assigned.

15. The method according to claim 13 further comprising the steps of:

at each base station, storing the current location of the geographic area of at least all of the mobile stations assigned to said each base station; and upon receiving a call at said base station for a mobile station assigned thereto, determining whether the called mobile station is located in a geographic area served by some other base station.

16. A multi-channel mobile radio telephone system of the type wherein mobile stations are capable of initiating and receiving calls to and from other mobile stations and stations in a public telephone system, wherein plural base stations service respective plural geographic areas as relay links for all calls and are capable of transmitting and receiving calls via each of said channels, each base station having multiple mobile stations assigned thereto, the base station to which a mobile station is assigned being designated the home base station for that mobile station, wherein a plurality of mobile stations are each individually tunable to respective channels for purposes of transmitting and receiving signals during calls, and wherein a mobile station may move from one geographical area to another and out of radio range of its home base station and yet intitate and receive calls with other mobile stations and with stations in said public telephone system, said system comprising:

at each base station, means for transmitting a call sign signal, unique to that base station, to all mobile stations within the general geographic area served by said each base station;

means at each mobile station for receiving said call sign signal;

means at each mobile station responsive to failure to receive from its home base station said call sign signal at least at a predetermined threshold level for automatically seeking and seizing a channel on which a call sign signal is transmitted from another base station;

means at each mobile station for transmitting to said another base station on said seized channel an identification signal which is unique to said each mobile station;

means for storing at said another base station a signal identifying said each mobile station; and means for transmitting from said another base station to all other base stations in said system another signal identifying the geographic area served by said another base station as the location of said each mobile station.

17. The system according to claim 16 further characterized in that the call metering for said mobile stations is automatically effected irrespective of in which geographic area a mobile station happens to be located, wherein each base station includes a meter circuit for each mobile station it serves as a home base station, said system further comprising:

a means for transmitting from said another base station to all other base stations a code signal representing the identity of said mobile station upon completion of a call by said mobile station at said another base station;

means for transmitting an acknowledgement signal from said home base station to said another base station upon receipt of said code signal at the home base station of said mobile station; and means for transmitting call data for the completed call from said another base station to said home base station upon receipt of said acknowledgement signal at said another base station.

18. The system according to claim 16 further comprising:

means for storing at each base station the current location of the geographic area of at least all of the mobile stations assigned to said each base station as a home base;

means at said base station responsive to receiving a call from a station in said public telephone system to a mobile station assigned to the base station for determining whether the called mobile station is located in a geographic area served by some other base station;

means at said base station responsive to a determination that said called mobile station is located in a geographic area served by some other base station for transmitting a recorded message to the calling party to indicate the telephone number which must be dialed to reach said called mobile station through said other base station.

19. In a mobile telephone system of the type wherein mobile stations are capable of initiating and receiving calls to and from other stations, wherein at least first and second base stations are provided to serve as links for all calls between a mobile station and other stations, said first and second mobile stations serving respective first and second geographic areas which overlap in a common area, said first and second base stations having respective first and second groups of frequencies assigned thereto for call transmissions from mobile stations located in the respective geographic areas served by said base stations, an improvement whereby a call in progress may automatically be switched from one base station to another as a mobile station involved in a call moves from one geographic area to another, said improvement being characterized by:

at least a first satellite receiver located in said common area and tuned to receive said first group of frequencies;

a satellite communications channel between said first satellite receiver and said second base station;

a base station communications channel between said base stations;

means at said satellite receiver for monitoring the level of mobile station transmissions received by said first satellite receiver at each of said first group of frequencies;

means at said first base station for monitoring the level of mobile station transmissions received by said first base station at each of said first group of frequencies;

means for periodically comparing the monitored levels of mobile station transmissions received at said first satellite receiver and said first base station; and means responsive to the level of a received mobile station transmission being greater at said first satellite receiver than at said first base station over a predetermined time interval for transferring communication control of that mobile station from said first base station to said second base station by shifting said mobile station transmission to a frequency in said second group of frequencies.

20. The system according to claim 19 further comprising:

a second satellite receiver located in said common area and turned to said second group of frequencies;

a satellite communications channel between said second satellite receiver and said first base station;

means at said second satellite receiver for monitoring the level of mobile transmissions received by said second satellite receiver at each of said second group of frequencies;

means at said second base station for monitoring the level of mobile transmission received by said second base station at each of said second group of frequencies;

means for periodically comparing the monitored levels of mobile station transmissions received at said second satellite receiver and said second base station; and means responsive to the level of a received mobile station transmission being greater at said second satellite station than at said second base station over a predetermined time interval for transferring communication control of that mobile station to said first base station by shifting said mobile station transmission to a frequency in said first group of frequencies.

21. In a mobile telephone system of the type wherein mobile stations are capable of initiating and receiving calls to and from other stations, wherein at least first and second base stations are provided to serve as links for all calls between a mobile station and other stations, said first and second mobile stations serving respective first and second geographic areas which overlap in a common area, said first and second base stations having respective first and second groups of frequencies assigned thereto for call transmissions from mobile stations located in the respective geographic areas served by said base stations, a method whereby a call in progress may automatically be switched from one base station to another as a mobile station involved in a call moves from one geographic area to another, said method comprising the steps of:

at both said first base station and at a satellite receiver located in said common area, receiving mobile station transmissions at said first group of frequencies;

for any mobile station transmission received at one of said first group of frequencies, periodically comparing the level of the transmissions received at said satellite receiver and said first base stations; and in response to the received mobile station transmission level being greater at said satellite receiver than at said first base station for a predetermined time period, transferring communication control for that mobile station from said first base station to said second base station by shifting said mobile station transmission to one of said second group of frequencies.

* * * * *